(12) United States Patent  
Iga et al.

(10) Patent No.: US 7,813,015 B2  
(45) Date of Patent: Oct. 12, 2010

(54) IMAGE PROCESSOR OF IMAGING APPARATUS

(75) Inventors: Kiichiro Iga, Kasugai (JP); Tomohiro Fukuoka, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1144 days.

(21) Appl. No.: 11/241,930

(22) Filed: Oct. 4, 2005

(65) Prior Publication Data

US 2006/0244992 A1 Nov. 2, 2006

(30) Foreign Application Priority Data

May 2, 2005 (JP) .............................. 2005-134226

(51) Int. Cl.
*H04N 1/46* (2006.01)
*H04N 1/40* (2006.01)
*H04N 7/14* (2006.01)
*G06K 9/36* (2006.01)

(52) U.S. Cl. ........................ 358/539; 358/471; 382/166; 382/232; 348/14.13

(58) Field of Classification Search ........................ None
See application file for complete search history.

(56) References Cited

U.S. PATENT DOCUMENTS

| | | | | |
|---|---|---|---|---|
| 3,958,088 A | * | 5/1976 | Vieri | ...................... 379/100.13 |
| 4,571,634 A | * | 2/1986 | Caneschi et al. | ........ 358/426.07 |
| 5,883,975 A | * | 3/1999 | Narita et al. | ................. 382/232 |
| 5,966,407 A | * | 10/1999 | Hiraki et al. | ................. 375/257 |
| 6,223,195 B1 | * | 4/2001 | Tonomura | .................... 708/402 |
| 6,636,645 B1 | * | 10/2003 | Yu et al. | ...................... 382/268 |
| 6,728,534 B1 | * | 4/2004 | Izumi et al. | .............. 455/426.1 |
| 7,359,408 B2 | * | 4/2008 | Kim | ............................ 370/509 |
| 2002/0012474 A1 | * | 1/2002 | Sato et al. | .................... 382/250 |
| 2002/0030751 A1 | * | 3/2002 | Takane | ........................ 348/222 |
| 2003/0133337 A1 | * | 7/2003 | Yamada et al. | .............. 365/200 |
| 2007/0046683 A1 | * | 3/2007 | Iga | .............................. 345/555 |

FOREIGN PATENT DOCUMENTS

JP 6-121275 A 4/1994

* cited by examiner

*Primary Examiner*—Mark K Zimmerman
*Assistant Examiner*—Mesfin Getaneh
(74) *Attorney, Agent, or Firm*—Fujitsu Patent Center

(57) ABSTRACT

A format conversion circuit converts RGB data to YCbCr data. A one-dimensional compression circuit performs one-dimensional compression process on the YCbCr data to generate one-dimension compression image data and provides the one-dimension compression image data to a base band LSI. The one-dimensional compression circuit includes a memory area that is relatively small but sufficient for holding several bytes of data subject to the compression process.

7 Claims, 3 Drawing Sheets

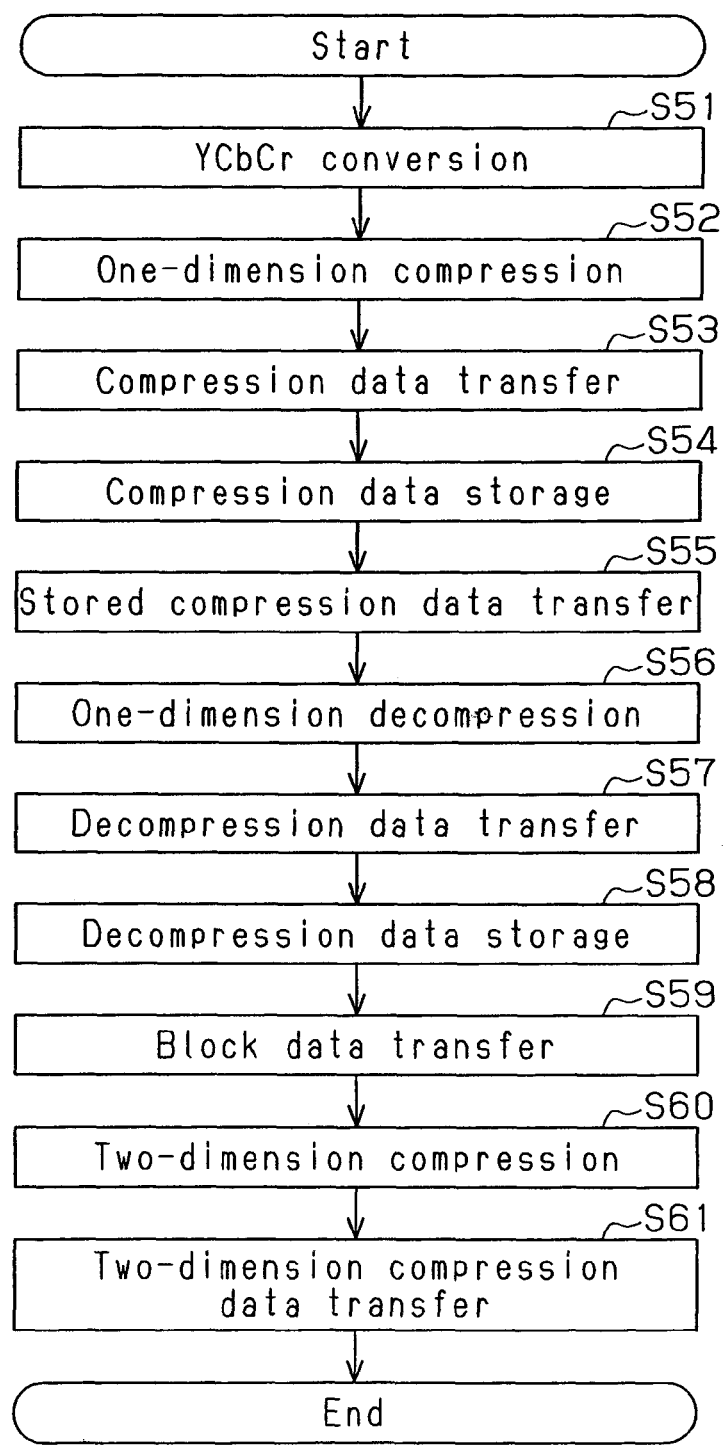

IMAGE PROCESSOR OF IMAGING APPARATUS

CROSS-REFERENCE TO RELATED APPLICATIONS

This application is based upon and claims the benefit of priority from prior Japanese Patent Application No. 2005-134226, filed on May 2, 2005, the entire contents of which are incorporated herein by reference.

BACKGROUND OF THE INVENTION

The present invention relates to an image processor of an imaging apparatus.

An imaging element having a large number of pixels over one million pixels, such as a CCD or a CiS (CMOS image sensor), is used in an imaging apparatus such as a digital camera. An image processor and a signal processing device are required to perform high-speed processing in order to process the large amount of image data provided from an imaging element.

FIG. 1 is a partial block circuit diagram of a conventional imaging apparatus. The imaging apparatus 10 includes a camera module 11, a base band LSI 12, and an image memory 13. The camera module 11 has an imaging unit 14, which includes an imaging element, and an image processing LSI 15, which processes the output signal of the imaging unit 14. The imaging unit 14 performs A/D conversion on an output signal of the imaging element, which is in accordance with the incident light and generates converted image data. The converted image data is formed from data of a plurality of pixels, with each piece of pixel data configured by data corresponding to the colors of red (R), green (G), and blue (B). The image processing LSI 15 includes a format conversion circuit (YCbCr conversion circuit) and an interface circuit. The image processing LSI 15 converts the image data of the three primary colors (RGB) to image data representing brightness/color difference (YCbCr). The interface circuit provides the converted image data to the base band LSI 12.

The base band LSI 12 includes a compression circuit 16 and ah interface circuit (not shown). The interface circuit stores the image data received from the camera module 11 in the image memory 13. The compression circuit 16 reads the image data stored in the image memory 13, converts the image data to compression data in a predetermined format (e.g., JPEG format), and stores the compression data in the image memory 13.

SUMMARY OF THE INVENTION

The number of pixels in an imaging element has increased. This has increased the amount of data each of the LSIs 12 and 15 process and the amount of data transferred from the image processing LSI 15 to the base band LSI 12. The time necessary to transfer the data affects the waiting time required until the next imaging becomes possible. However, a long waiting time would lower the performance of the camera.

To shorten the waiting time, the transfer speed between the image processing LSI 15 and the base band LSI 12 may be increased. For instance, the frequency of the clock signal used to transfer the data between the image processing LSI 15 and the base band LSI 12 may be raised to increase the transfer speed. However, conventional interface circuits are not applicable for higher clock signal speeds. Further, the use of an interface circuit applicable for a higher transfer speed would increase the cost of the LSI.

As another way to shorten the waiting time, data may be compressed into the JPEG format by the image processing LSI 15 to reduce the amount of transfer between the image processing LSI 15 and the base band LSI 12. However, in order to compress data into the JPEG format with the image processing LSI 15, the image processing LSI 15 must be provided with a memory for storing data prior to and subsequent to the compression process. Further, the JPEG format compression process includes a two-dimensional DCT calculation process. The two-dimensional DCT calculation process is a process using data for eight vertical lines. Thus, the image processing LSI 15 must have a memory for storing data for eight lines. A memory for storing the image data that is input from the imaging element during the two-dimensional compression process is also necessary. However, the use of a large-capacity memory enlarges the chip scale and increases the chip cost of the image processing LSI 15.

It is an object of the present invention to provide an image processor, which is used for an imaging element having a large number of pixels, with lower cost.

One aspect of the present invention is an image processor connectable to an imaging unit. The image processor includes an image processing circuit for receiving image data from the imaging unit, performing a predetermined image process on the image data, and generating processed data. A one-dimensional compression circuit receives the processed data from the image processing circuit, performs a one-dimensional compression process on the processed data, and generates one-dimension compression data. An output circuit receives the one-dimension compression data from the one-dimensional compression circuit and outputs the one-dimension compression data to an external circuit connected to the image processor.

Another aspect of the present invention is an imaging device including an imaging unit for generating image data in accordance with incident light. An image processor is connected to the imaging unit. The image processor includes an image processing circuit for receiving the image data from the imaging unit, performing a predetermined image process on the image data, and generating processed data. A one-dimensional compression circuit receives the processed data from the image processing circuit, performs a one-dimensional compression process on the processed data, and generates one-dimension compression data. An output circuit receives the one-dimension compression data from the one-dimensional compression circuit and outputs the one-dimension compression data to an external circuit connected to the image processor.

A further aspect of the present invention is an image processing system including an imaging unit for generating image data in accordance with incident light. An image processor is connected to the imaging unit. A signal processor connected between the image processor and an image memory. The image processor includes an image processing circuit for receiving the image data from the imaging unit, performing a predetermined image process on the image data, and generating processed data. A one-dimensional compression circuit receives the processed data from the image processing circuit, performs a one-dimensional compression process on the processed data, and generates one-dimension compression data. An output circuit receives the one-dimension compression data from the one-dimensional compression circuit and outputs the one-dimension compression data to an external circuit connected to the image processor. The signal processor receives the one-dimension compression data from the output circuit and performs compression data storage in which the one-dimension compression data is stored in the image memory.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a flowchart showing a compression process.

DETAILED DESCRIPTION OF THE PREFERRED EMBODIMENTS

Figure 1:
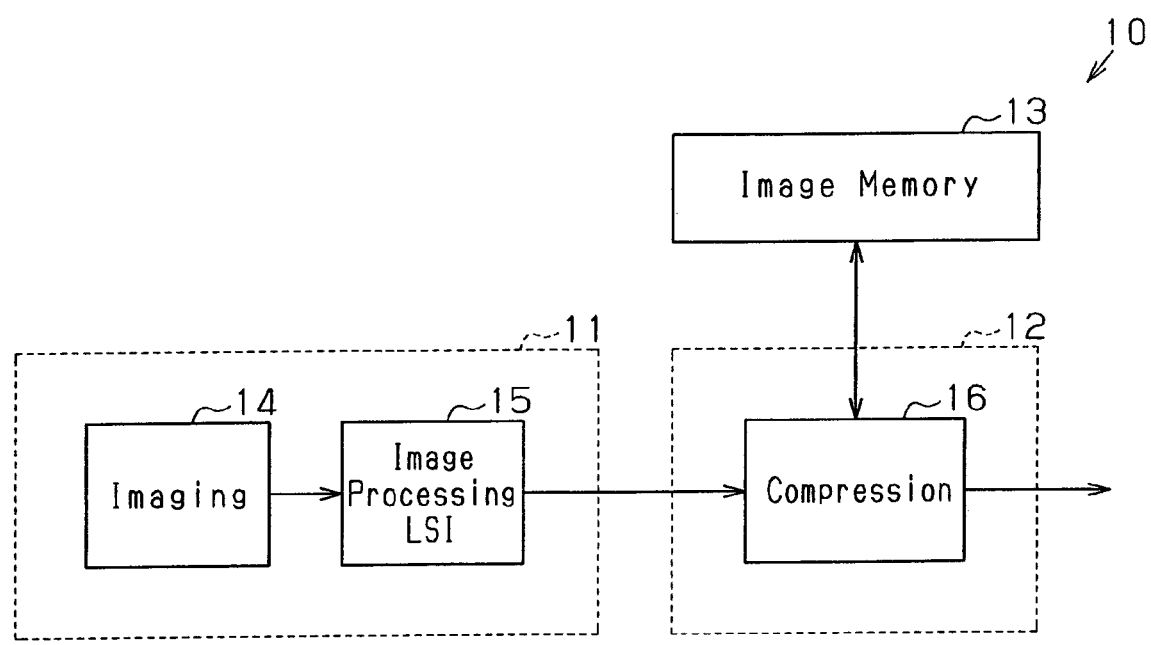
FIG. 1 is a partial block circuit diagram of a conventional image processing system.
Figure 2:
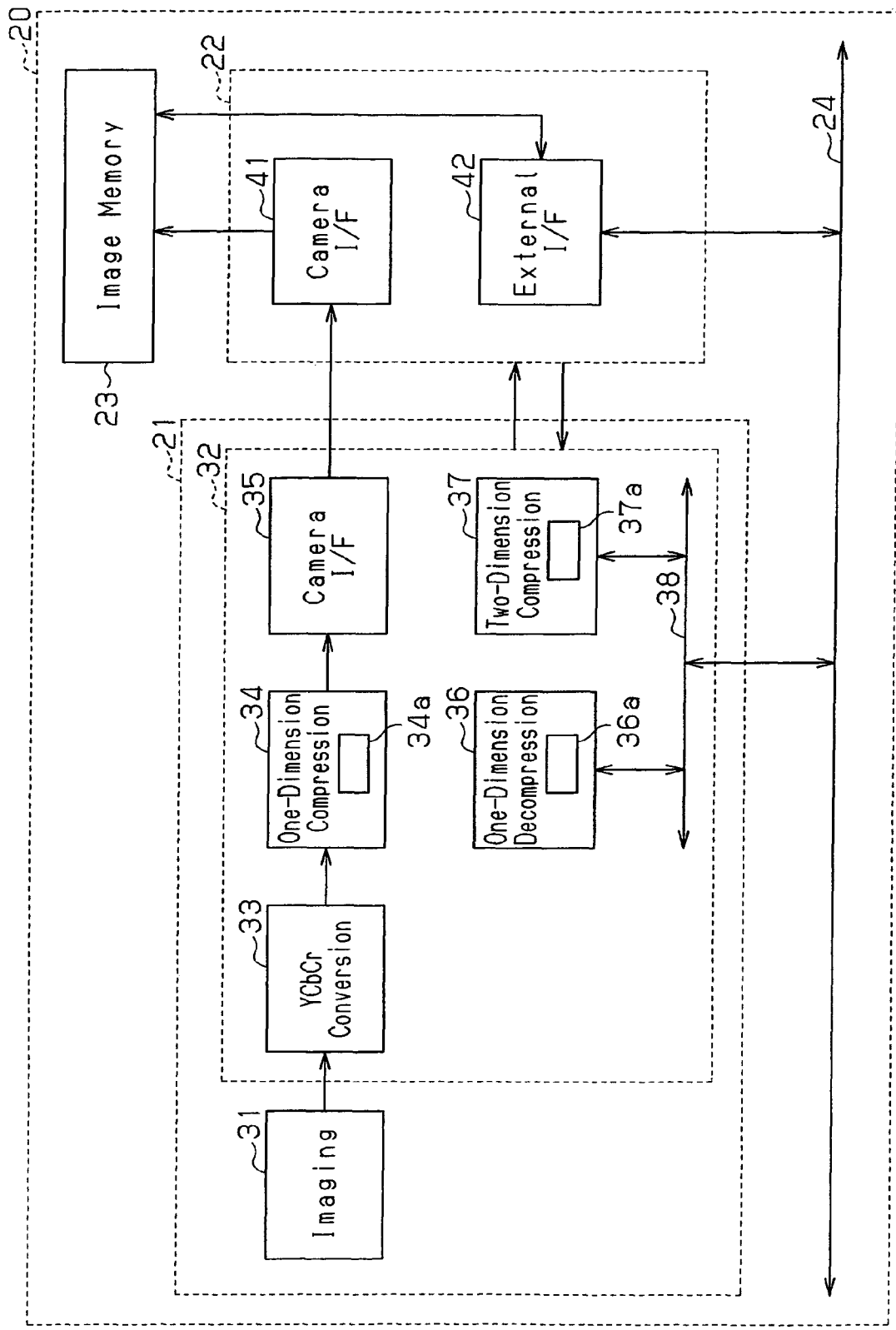
FIG. 2 is a partial block circuit diagram of an image processing system according to a preferred embodiment of the present invention.

An image processing system according to a preferred embodiment of the present invention will now be described. FIG. 2 is a partial block circuit diagram of an image processing system 20.

The image processing system 20 is, for example, a digital still camera (DSC). The image processing system 20 includes a camera module 21 functioning as an imaging apparatus, a base band LSI 22, and an image memory 23. The camera module 21 is directly connected to the base band LSI 22. The camera module 21 is also connected to the base band LSI 22 by a system bus 24. Peripheral circuits (not shown) included in the image processing system 20 are connected to the system bus 24. Examples of the peripheral circuits include a central processing unit (CPU) for controlling the entire image processing system 20, an interface circuit for connecting the image processing system 20 to a personal computer or the like, and an interface circuit for connection to an external memory for storing image data.

The camera module 21 includes an imaging unit 31 and an image processing LSI 32. The image processing LSI 32 functions as an image processor.

The imaging unit 31 includes a color filter, a CCD imaging element, and an analog front end circuit. The color filter includes, for example, filter regions of red (R), green (G), and blue (B), which are configured in a Bayer array. The imaging element includes a matrix array of a plurality of light receiving cells (pixels). Further, the imaging element vertically and horizontally transfers and outputs signals charged in each light receiving cell in accordance with the incident light. The analog front end circuit performs A/D conversion on the output signal of the imaging element to a digital signal and outputs the converted signal. The converted signal is image data such as Bayer data. In the image data, each pixel includes information of each of the colors of red (R), green (G), and blue (B). The imaging element of the imaging unit 31 may be a CiS imaging element.

The image processing LSI 32 converts the image data (RGB data), which is configured by information of the three primary colors, to image data (hereinafter referred to as "YCbCr data") including brightness information and color information (e.g., color difference information). Then, the image processing LSI 32 provides the converted image data to the base band LSI 22. The image processing LSI 32 includes a format conversion circuit (YCbCr conversion circuit) 33 functioning as an image processing circuit, a one-dimensional compression circuit 34, a camera interface 35 functioning as an output circuit, a one-dimensional decompression circuit 36, and a two-dimensional compression circuit 37.

The format conversion circuit 33 generates the YCbCr data from the RGB data. The one-dimensional compression circuit 34 performs one-dimensional compression on the YCbCr data sequentially provided from the format conversion circuit 33 in a predetermined manner and outputs compression image data. The Huffman coding technique is used, for example, to perform the one-dimensional compression. The one-dimensional compression circuit 34, which includes an internal memory 34a having a capacity of several bytes to store the data necessary for the compression process, stores sequentially provided image data in the internal memory 34a. The one-dimensional compression circuit 34 compresses the data stored in the internal memory 34a in accordance with the Huffman coding technique. Then, the one-dimensional compression circuit 34 outputs the compression image data. The camera interface 35 provides the image data output from the one-dimensional compression circuit 34 to the base band LSI 22.

The amount of image data corresponding to a single screen provided from the one-dimensional compression circuit 34 is small compared to the amount of image data corresponding to a single screen provided from the imaging unit 31 and the amount of image data corresponding to a single screen provided from the format conversion circuit 33. This enables the camera interface 35 to transfer the image data without having to use a clock signal having a high frequency.

The one-dimensional decompression circuit 36 and the two-dimensional compression circuit 37 are connected to an internal bus 38. The internal bus 38 is connected to the system bus 24. The one-dimensional decompression circuit 36 performs decompression on the input data in a format corresponding to the compression performed by the one-dimensional compression circuit 34. Then, the one-dimensional decompression circuit 36 outputs the decompression data. The one-dimensional decompression circuit 36, which has an internal memory 36a having a capacity of several bytes to store the data necessary for the decompression process, stores the data provided via the internal bus 38 in the internal memory 36a. The one-dimensional decompression circuit 36 performs decompression on the data stored in the internal memory 36a and outputs decompression data.

The two-dimensional compression circuit 37 compresses data in a predetermined compression format (JPEG format). More specifically, the two-dimensional compression circuit 37 includes an internal memory 37a having a capacity enabling storage of data necessary for the compression process. The two-dimensional compression circuit 37 stores data provided via the internal bus 38 in the internal memory 37a. The two-dimensional compression circuit 37 then performs a DCT calculation process and a coding process on the data stored in the internal memory 37a and outputs the processed data.

The base band LSI 22 includes a camera interface 41 and an external interface 42. The base band LSI 22 is connected to the image memory 23. The image memory 23, which has a memory capacity enabling storage of image data corresponding to a single screen, is, for example, an SDRAM. The base band LSI 22 functions as a signal processor for storing the image data provided to the camera interface 41 in the image memory 23.

The base band LSI 22 controls the image processing LSI 32 to convert the image data stored in the image memory 23 into compression data of a predetermined format (JPEG format). The image processing LSI 32 outputs image data compressed in a predetermined one-dimensional compression format. The base band LSI 22 first uses the one-dimensional decompression circuit 36 of the image processing LSI 32 to acquire decompression data by decompressing the image data stored in the image memory 23 and then stores the data in the image memory 23. Next, the base band LSI 22 uses the two-dimensional compression circuit 37 of the image processing LSI 32 to acquire compression image data in JPEG format by compressing the decompression image data and then stores the compression image data in the image memory 23. The image data compressed in the one-dimensional compression format is referred to as one-dimension compression image data. The image data compressed in the two-dimensional compression format is referred to as two-dimension compression image data.

More specifically, the base band LSI 22 outputs a decompression command for performing the decompression process to the image processing LSI 32 when decompressing the one-dimension compression image data stored in the image memory 23. The image processing LSI 32 prepares for the decompression process with the one-dimensional decompression circuit 36 in response to the decompression command. When the preparation is completed, the image processing LSI 32 outputs an interruption signal to the base band LSI 22. The base band LSI 22 sequentially reads the one-dimension compression image data from the image memory 23 in response to the interruption signal and provides the one-dimension compression image data to the image processing LSI 32 via the system bus 24. The image processing LSI 32 sequentially receives the one-dimension compression image data via the internal bus 38. The one-dimensional decompression circuit 36 decompresses the received one-dimension compression image data to generate decompression image data and provides the decompression image data to the base band LSI 22 via the internal bus 38 and the system bus 24. The base band LSI 22 stores the decompression image data received via the system bus 24 in the image memory 23.

In this manner, the image processing LSI 32 includes the one-dimensional compression circuit 34 and the one-dimensional decompression circuit 36. The base band LSI 22 uses the one-dimensional decompression circuit 36 of the image processing LSI 32 to acquire decompression data by converting the one-dimension compression image data provided from the image processing LSI 32. Thus, even if the compression format of the one-dimensional compression circuit 34 is unknown, this ensures that the base band LSI 22 acquires decompression data.

The base band LSI 22 then outputs a compression command for performing the compression process to the image processing LSI 32. The image processing LSI 32 prepares for the compression process with the two-dimensional compression circuit 37 in response to the compression command. When the preparation is completed, the image processing LSI 32 outputs an interruption signal to the base band LSI 22. The base band LSI 22 sequentially reads the decompression data from the image memory 23 in response to the interruption signal and provides the decompression data to the image process LSI 32 via the system bus 24. The image process LSI 32 sequentially receives the decompression data via the internal bus 38. The two-dimensional compression circuit 37 then compresses the input decompression data to generate two-dimension compression image data. Then, the two-dimensional compression circuit 37 provides the two-dimension compression image data to the base band LSI 22 via the internal bus 38 and the system bus 24. The base band LSI 22 stores the two-dimension compression image data received via the system bus 24 in the image memory 23.

FIG. 3 is a flowchart showing a process for generating the two-dimension compression image data performed by the image processing system 20.

First, in step S51 (format conversion or YCbCr conversion), the format conversion circuit 33 of the image processing LSI 32 converts image data in the Bayer format provided from the imaging unit 31 to data in the YCbCr format and then provides the converted data to the one-dimensional compression circuit 34. In step S52 (one-dimensional compression), the one-dimensional compression circuit 34 compresses the input data in accordance with a known one-dimensional compression format and provides the compressed one-dimension compression image data to the camera interface 35. In step S53 (compression data transfer), the camera interface 35 transfers the one-dimension compression image data, received from the one-dimensional compression circuit 34, to the base band LSI 22.

In step S54 (compression data storage), the camera interface 41 of the base band LSI 22 stores the one-dimension compression image data, received from the image processing LSI 32, in the image memory 23. In step S55 (stored compression data transfer), the base band LSI 22 provides the one-dimension compression image data stored in the image memory 23 to the image processing LSI 32 via the system bus 24.

In step S56 (one-dimensional decompression), the one-dimensional decompression circuit 36 of the image processing LSI 32 performs decompression on the one-dimension compression image data received via the internal bus 38. In step S57 (decompression data transfer), the one-dimensional decompression circuit 36 transfers the decompression image data to the base band LSI 22 via the internal bus 38 and the system bus 24.

In step S58 (decompression data storage), the base band LSI 22 stores the decompression image data, received via the system bus 24 from the image processing LSI 32, in the image memory 23. In step S59 (block data transfer), the base band LSI 22 reads one block of data (image data corresponding to 8×8 pixels) that is to undergo the DCT calculation process from the image memory 23 and transfers the block data to the image processing LSI 32.

In step S60 (two-dimensional compression), the two-dimensional compression circuit 37 of the image processing LSI 32 performs compression on the decompression image data received via the internal bus 38. In step S61 (two-dimension compression data transfer), the two-dimensional compression circuit 37 transfers the two-dimension compression image data.

The preferred embodiment has the following advantages.

(1) After converting RGB data to YCbCr data with the format conversion circuit 33, the one-dimensional compression circuit 34 performs one-dimensional compression process on the converted data. One-dimension compression image data is then provided to the base band LSI 22. The one-dimensional compression circuit 34 only needs to store several bytes of data near the data subject to compression. Thus, a large memory space is not necessary. Further, the size of compression data is small compared to the size of non-compressed input data. Thus, even if the size of non-compression data becomes large as the number of pixels increases in the imaging unit 31, by transferring the compression data, the waiting time until the next imaging may be performed is shortened without having to perform high-speed data transfer or increasing the speed of the camera interface 35. Therefore, the image processing LSI 32 is applicable to the imaging unit 31, which has a large number of pixels, while suppressing an increase in costs.

(2) The image processing system 20 includes the one-dimensional decompression circuit 36, which performs one-dimensional decompression process in correspondence with the compression process of the one-dimensional compression circuit 34. Therefore, decompression data is obtained from the data compressed by the one-dimensional compression circuit 34 even for a device that does not comply with the compression format. Further, since the compression data is input to the one-dimensional decompression circuit 36 via the internal bus 38, that is, the compression data is input through a path differing from the path in which the one-dimensional compression circuit 34 outputs the compression data, the decompression data is input without affecting the transfer of the compression data generated by the one-dimensional compression circuit 34.

(3) The image processing LSI 32 includes the two-dimensional compression circuit 37, which performs the two-dimensional compression process on the externally input data. Accordingly, data further compressed during the two-dimensional compression process is generated. When the two-dimensional compression circuit 37 performs the DCT calculation process, such as when generating JPEG format data, block data of 8×8 pixels becomes necessary for the DCT calculation process. However, the base band LSI 22 reads the necessary block data from the image memory 23 and sequentially provides the block data to the two-dimensional compression circuit 37. This eliminates the need for a large capacity memory, avoids enlargement of the chip scale of the image processing LSI 32, and suppresses cost increase of the camera module 21.

(4) The format conversion circuit 33 converts the image data input from the imaging unit 31 to YCbCr data. The data subsequent to YCbCr conversion has a greater volume than the RGB data. Thus, even if the conversion increases the volume of non-compressed data, the generation of compression data with the one-dimensional compression circuit 34 and the transfer of the compression data eliminates the need to perform high-speed data transfer or the need for an output circuit with increased speed. This suppresses cost increase and facilitates application of the image processing system 20 to an imaging unit 31 having a large number of pixels.

It should be apparent to those skilled in the art that the present invention may be embodied in many other specific forms without departing from the spirit or scope of the invention. Particularly, it should be understood that the present invention may be embodied in the following forms.

The image processing system 20 may be applied to an imaging device other than a digital still camera, such as, a digital video camera, a cellular telephone incorporating a camera, a digital camera incorporated in a personal computer, and the like.

The one-dimensional compression circuit 34 may calculate the difference between two pieces of sequentially input image data to compress the entire image data by replacing the difference with a bit rate that is in accordance with the Huffman coding technique. Further, the one-dimensional compression circuit 34 may perform the one-dimensional compression process on the input data in accordance with a technique other than the Huffman coding technique.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An image processor connectable to an imaging unit, the image processor comprising:
    an image processing circuit configured to receive image data from the imaging unit and perform a predetermined image process on the image data to generate processed data;
    a one-dimensional compression circuit configured to receive the processed data from the image processing circuit, perform a one-dimensional compression process on the processed data to generate one-dimension compression data;
    an output circuit configured to receive the one-dimension compression data from the one-dimensional compression circuit and output the one-dimension compression data to an image memory via a base band LSI connected to the image processor;
    a one-dimensional decompression circuit configured to receive the one-dimension compression data from the image memory via the base band LSI, perform a one-dimensional decompression process corresponding to the one-dimensional compression process on the received one-dimension compression data to generate one-dimension decompression data, and output the one-dimension decompression data to the image memory via the base band LSI; and
    a two-dimensional compression circuit configured to receive the one-dimension decompression data from the image memory via the base band LSI, perform a two-dimensional compression process on the one-dimension decompression data input from the image memory via the base band LSI to generate two-dimension compression data, and output the two-dimension compression data to the image memory via the base band LSI.

2. The image processor according to claim 1, wherein:
    the imaging unit provides image data including information of three primary colors to the image processing circuit; and
    the image processing circuit is a YCbCr conversion circuit configured to convert the image data including the information of three primary colors into YCbCr data.

3. An imaging device comprising:
    an imaging unit configured to generate image data in accordance with incident light; and
    an image processor connected to the imaging unit, the image processor including:
    an image processing circuit configured to receive the image data from the imaging unit and perform a predetermined image process on the image data to generate processed data;
    a one-dimensional compression circuit configured to receive the processed data from the image processing circuit and perform a one-dimensional compression process on the processed data to generate one-dimension compression data;
    an output circuit configured to receive the one-dimension compression data from the one-dimensional compression circuit and output the one-dimension compression data to an image memory via a base band LSI connected to the image processor;
    a one-dimensional decompression circuit configured to receive the one-dimension compression data from the image memory via the base band LSI, perform a one-dimensional decompression process corresponding to the one-dimensional compression process on the received one-dimension compression data to generate one-dimension decompression data, and output the one-dimension decompression data to the image memory via the base band LSI; and a two-dimensional compression circuit configured to receive the one-dimension decompression data from the image memory via the base band LSI, perform a two-dimensional compression process on the one-dimension decompression data input from the image memory via the base band LSI to generate two-dimension compression data, and output the two-dimension compression data to the image memory via the base band LSI.

4. An image processing system comprising:

an imaging unit configured to generate image data in accordance with incident light;

an image processor connected to the imaging unit; and a signal processor connected between the image processor and an image memory;

the image processor including:

an image processing circuit configured to receive the image data from the imaging unit, perform a predetermined image process on the image data to generate processed data;

a one-dimensional compression circuit configured to receive the processed data from the image processing circuit, perform a one-dimensional compression process on the processed data to generate one-dimension compression data;

an output circuit configured to receive the one-dimension compression data from the one-dimensional compression circuit and output the one-dimension compression data to the image memory via the signal processor connected to the image processor;

wherein:

the signal processor receives the one-dimension compression data from the output circuit and performs compression data storage in which the one-dimension compression data is stored in the image memory;

the signal processor performs the stored one-dimensional compression data transfer in which the one-dimensional compression data is read from the image memory and provided to the image processor;

the image processor performs a one-dimensional decompression process, which is in correspondence with the compression process performed by the one-dimensional compression circuit, on the one-dimensional compression data received from the signal processor to generate one-dimensional decompression image data and outputs the one-dimensional decompression data to the signal processor;

the signal processor performs decompression data storage in which the one-dimensional decompression data is stored in the image memory, block data transfer in which block data is read from the image memory and provided to the signal processor, and the image processor performs a two-dimensional compression process on the block data to generate two-dimensional compression data and outputs the two-dimensional compression data to the signal processor.

5. The image processor according to claim 1, wherein:

the output circuit is coupled to the base band LSI via a path to output the one-dimension compression data to the base band LSI, the one-dimensional decompression circuit is coupled to the base band LSI via a bus differing from the path to receive the one-dimension compression data from the base band LSI, and the one-dimensional decompression circuit outputs the one-dimension decompression data to the same image memory via the base band LSI.

6. The imaging device according to claim 3, wherein:

the output circuit is coupled to the base band LSI via a path to output the one-dimension compression data to the base band LSI, the one-dimensional decompression circuit is coupled to the base band LSI via a bus differing from the path to receive the one-dimension compression data from the base band LSI, and the one-dimensional decompression circuit outputs the one-dimension decompression data to the same image memory via the base band LSI.

7. The image processing system according to claim 4, wherein:

the output circuit is coupled to the signal processor via a path to output the one-dimension compression data to the signal processor, a one-dimensional decompression circuit performing the one-dimensional decompression process is coupled to the signal processor via a bus differing from the path to receive the one-dimension compression data from the signal processor, and the one-dimensional decompression circuit outputs the one-dimension decompression data to the same image memory via the signal processor.

* * * * *